May 23, 1961  E. A. JOHNSON  2,985,749
HEADLIGHT REFLECTOR
Filed Jan. 14, 1960  2 Sheets-Sheet 1

INVENTOR.
Earl A. Johnson.
BY
ATTORNEYS.

May 23, 1961
E. A. JOHNSON
2,985,749
HEADLIGHT REFLECTOR
Filed Jan. 14, 1960
2 Sheets-Sheet 2
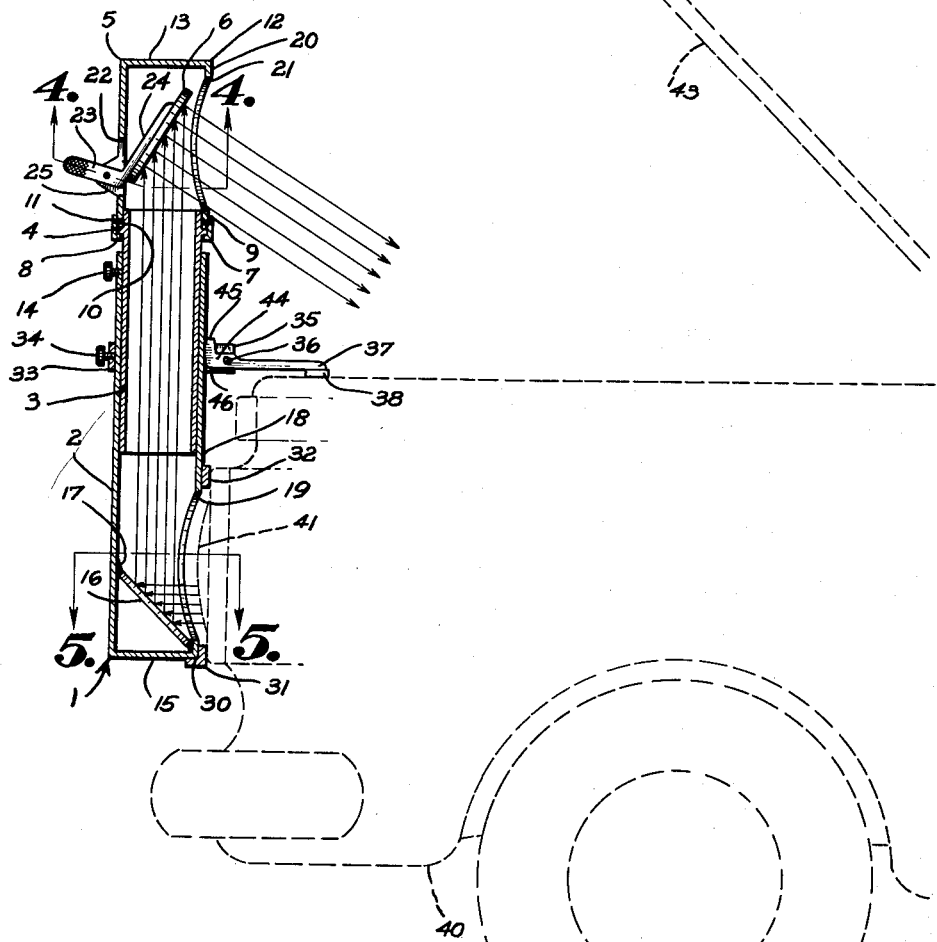
INVENTOR.
Earl A. Johnson.
BY
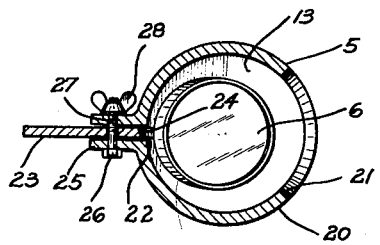
ATTORNEYS.

United States Patent Office 2,985,749
Patented May 23, 1961

2,985,749
HEADLIGHT REFLECTOR
Earl A. Johnson, 11041 E. 54th St., Kansas City, Mo.
Filed Jan. 14, 1960, Ser. No. 2,423
2 Claims. (Cl. 240—7.1)

This invention relates to a light reflector and more particularly to apparatus for attachment to the front end of an automobile to reflect the light from the headlight thereon to a point of use adjacent the automobile.

Various apparatuses have been devised for reflecting the light from a headlight of an automobile or the like but due to the changes in design of such automobiles, the present day reflectors which are usually attached to the rim of the headlight are ineffective and unsatisfactory.

It is the principal object of the present invention to provide a device for reflecting light from a headlight of an automobile alongside of the car and particularly towards the wheels thereof for use in changing tires and other work on parts of the automobile.

Other objects of the present invention are to provide a telescoping cylindrical member having spaced magnets on one end thereof and an arm pivoted on a collar on the cylindrical member for adjustment there along, the arm also having a magnet for engaging a part of the automobile and the other magnets also engaging the automobile on either side of the headlight for holding the same thereon; to provide openings in the telescoping members through which the light rays may pass; to provide a mirror in the end of the telescoping member at approximately a 45° angle for reflecting the light longitudinally of the tubular member; to provide the outer end of the telescoping member with a reflector therein adjustable circumferentially to the first tubular member as well as by changing the angle of the reflector with respect to the first reflector; to provide a housing for the reflector on the outer end of the telescoping tubular member rotatable on the tubular member; to provide means for holding the telescoping members in adjustable position, and to provide an article of this character simple and economical to manufacture.

In accomplishing these and other objects of the invention I am providing improved details of structure the preferred forms of which are shown in the accompanying drawings wherein:

Fig. 3 is a cross sectional view through the reflector with the reflector shown attached in a vertical position over the headlight of an automobile to reflect the light to the motor thereof.

Fig. 4 is the cross sectional view taken on line 4—4, Fig. 3.

Figure 5:
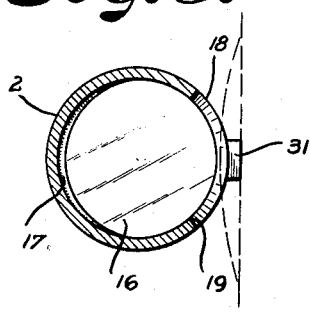
Fig. 5 is a cross sectional view taken on the line 5—5, Fig. 3.

Referring more in detail to the drawings:

1 designates a reflecting device embodying the features of my invention consisting of a cylindrical housing 2 having a tubular member 3 telescoped therein and rotatable and slidable therein to adjust the length of the device with respect to the position of the reflector with respect to the automobile as later described. The outer end of the tubular member 3 is provided with an angular rib 4 for mounting a tubular housing 5 for enclosing a reflector or mirror 6 therein. An annular band 7 having an inwardly extending annular shoulder 8 is provided for engaging over the rib 4. The portion 9 of the band 7 engages over the open end 10 of the housing 5 and is suitably secured thereto by screws or the like 11 to retain the housing 5 on the tubular member 3 and mounting the same rotatable thereon. The end 12 of the housing 5 opposite the open end 10 is closed by a plate member 13 as best illustrated in Fig. 3. The tubular member 3 with the housing 5 rotatably mounted thereon is held in the desired position in the cylindrical housing 2 by a set screw 14 as also illustrated in Fig. 3. Mounted near the closed end 15 of the cylindrical housing 2 at substantially a 45° angle is a mirror or reflector 16 that is rigidly and permanently mounted therein by suitable means as indicated at 17, Fig. 5. The sidewall 18 of the cylindrical housing 2 is provided with an opening 19 to provide access of light to the mirror as will later be described.

The mirror or reflector member 6 is movable within the tubular housing 5. The sidewall 20 of the housing 5 is provided with an opening 21 through which the beam of light may be reflected from the mirror 6 as later described. Opposite the opening 21 is a slot-like opening 22 in the sidewall of the housing 5 and extending therethrough is an arm 23 of a bracket 24 to which the mirror 6 is attached by suitable means. The arm 23 is pivotally mounted between ears 25 suitably mounted on the outside of the sidewall 20 adjacent the opening 22 by a bolt 26 so that the mirror 6 may be moved at the desired angle to which the angle of incident is desired to direct the light at a specific point. The bolt 26 has a threaded end 27, adapted to be engaged by a wing nut 28, whereby tightening of the nut 28 will hold the arm 23 and thus the mirror 6 at the desired angle. The mirror 6 thus is moved to different degrees of angle with respect to the mirror 16. The angle of incident of the reflection of light from mirror 6 may also be changed by turning of the housing 5 on the tubular member 3, or by rotation of the member 3 as well as longitudinal movement thereof in the cylindrical housing 2 after the set screw 14 has been loosened.

In order to attach the reflector to an automobile I provide on edge 30 of the housing 2 a magnetic member 31 and near the opening 19 spaced longitudinally from the magnet 31 is a magnet 32.

A collar 33 is provided for encircling the cylindrical housing 2 and is slidable thereon, but may be held in position thereon by a set screw 34. The band 33 has ears 35 and pivotally mounted therebetween by pin 36 is an arm 37 having a magnet 38 on the outer end thereof.

Figure 2:
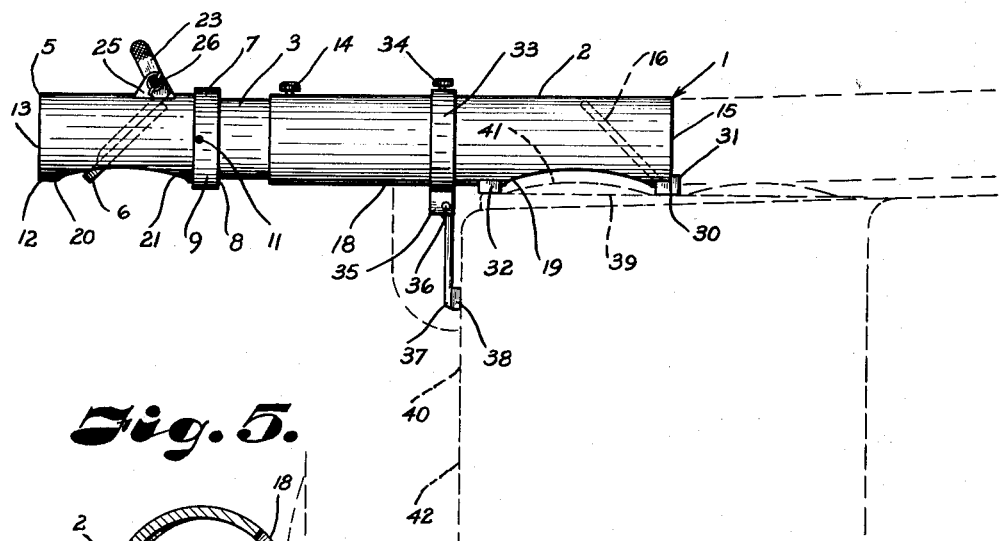
Fig. 2 is a plan view showing the reflector attached over the headlight of an automobile and the pivoted arm with the magnet thereon engaging the side of the automobile.

In Fig. 2 I have illustrated the magnets 31 and 32 engaging the front portion 39 of the an automobile 40 adjacent the headlight 41 so that the opening 19 will be positioned over the headlight. The reflecting device extends transversely outwardly from the side 42 of the automobile and the arm 37 with the magnet 38 thereon is extending outwardly from the telescoping member 2 so that the magnet 38 engages the side 42 of the automobile to hold the reflector rigidly to the automobile. Light from the headlight 41 will be reflected from the mirror 16 so that the beam extends longitudinally of the telescoping member to contact the mirror 6. By manipulating the arm 23 of the mirror the mirror may be adjusted with respect to the mirror 16 to direct the beam light rays towards the front wheels of the automobile or towards the side of the car. By rotating the cylindrical housing 5 on the tubular member 3 the direction of the light rays may be changed to different parts of the side of the car. It will be obvious that the reflecting device may be attached to either headlight so as to provide light on either side of the automobile.

In Fig. 3 I have illustrated the reflecting device in vertical position to direct the light rays to the motor of the automobile. In this position the magnets 31 and 32 are secured to the front of the automobile over the headlight 41 and the magnet 38 on the arm 37 may engage the top of the automobile. This arm is attached to the collar 23 and is adjustable lengthwise of the tubular member 2 to accommodate the difference between the headlight and the top of the automobile or some other object of the car to which the magnet is desired to contact. The pivot end 44 of the arm 37 has an upstanding portion or lug 45 on one side thereof adapted to engage the wall 18 of the housing 2 to provide a stop when the arm 37 is in an extended position (Fig. 3). The arm end 44 opposite the lug 45 is arcuate in shape as at 46 to allow the arm 37 to swing towards the magnet 32 when not in use.

With the reflecting device in a direction as shown in Fig. 3 the light reflected from the mirror 16 to the mirror 6 and said mirror may be adjusted by loosening of the wing nut 28 to direct the beam of light into the motor of the automobile after the hood 43 is raised as indicated by dotted lines (Fig. 3). The light rays may be reflected to different parts by manipulation of the mirror 6 as above described and also by rotating of the housing 5 on the cylindrical member 3. The cylindrical member 3 is also adjustable and held in place with respect to the cylindrical member 2 when the device is in use by set screw 14 as previously described.

It will be obvious from the foregoing that I have provided an improved device for the reflecting light from the headlight of an automobile to various parts of an automobile or other type of vehicle which is easily attached to the car and detached therefrom.

Figure 1:
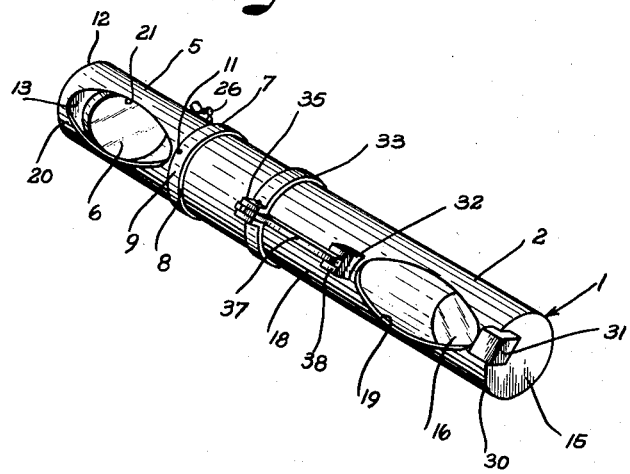
Fig. 1 is a perspective view of my invention in a collapsed position for non-use.

It will further be obvious that the device may be telescoped together as shown in Fig. 1 and the arm 37 being pivoted will lie alongside the telescoping member 2 and the magnets 38 and 32 contact each other to make a compact package.

What I claim and desire to secure by Letters Patent is:

1. A light reflecting device of the character described for attachment to a vehicle adjacent a headlight thereof comprising, a first tubular member having a closed end and an open end and having an opening in the side wall thereof near said closed end through which rays from said headlight will extend, a second tubular member having open ends slidably telecsoping within the first member and rotatable with respect to the other tubular member, magnet means on each side of said opening in the side wall of the first member attaching said member to said vehicle adjacent said headlight, a mirror in said first member near said opening in the side wall thereof at substantially a 45° angle to said closed end for reflecting rays of light from said headlight, a housing rotatably mounted on the outer end of the second tubular member, said housing having a closed outer end, an opening in a side wall thereof, a mirror in said housing adjacent said last named opening for reflecting the light from the first mirror to a part of said vehicle, and means pivotally mounting said last named mirror in the wall of said housing oppositely of said opening therein for adjusting the angle of said second mirror with respect to the first mirror to change the reflection incident to said first mirror, said last named means including a lever arm extending outwardly of said housing having connection with said second mirror.

2. A light reflecting device of the character described for attachment to a vehicle adjacent a headlight thereof comprising, first and second longitudinally slidable extensible members rotatable one with respect to the other, the first member having a closed end and an opening in one side near said end, magnets secured to said first extensible member on each side of said opening for attaching said member to said vehicle with said opening adjacent said headlight, a band slidable on said second member, said band having ears, an arm pivotally secured between said ears, a magnet on said arm for engaging a part of said vehicle for bracing said extensible members when attached to the vehicle, a mirror in said first member at substantially a 45° angle to the closed end of said member for reflecting rays of light from said headlight, said second member having a closed end and an opening in the side wall thereof near said closed end, a mirror in the second extensible member adjacent the last named opening for reflecting the light from the first mirror to a part of said vehicle, and means for adjusting the angle of said second mirror with respect to the first mirror to change the reflection incident to said first mirror, said last named means including a lever arm extending outwardly of said second extensible member having connection with said second mirror.

References Cited in the file of this patent

UNITED STATES PATENTS

| | | |
|---|---|---|
| 1,298,611 | West | Mar. 25, 1919 |
| 1,828,924 | Chardell et al. | Oct. 27, 1931 |
| 2,325,253 | Laging | July 27, 1943 |
| 2,413,628 | Hinds | Dec. 31, 1946 |